United States Patent [19]

Crackel et al.

[11] 4,313,425
[45] Feb. 2, 1982

[54] SPECTRAL CONVERTOR

[76] Inventors: Lawrence E. Crackel, 1245 S. Welch Cir., Lakewood, Colo. 80228; Lloyd S. Oglesby, 945 Lincoln St., Denver, Colo. 80203

[21] Appl. No.: 125,258

[22] Filed: Feb. 28, 1980

[51] Int. Cl.³ .......................... F24J 3/02; C25B 3/00; H01M 6/30
[52] U.S. Cl. .................................. 126/438; 126/900; 126/901; 204/129; 429/111
[58] Field of Search ............... 126/438, 424, 421, 417, 126/900, 901, 435; 204/128, 129; 429/111; 362/32, 84

[56] References Cited

U.S. PATENT DOCUMENTS 4,011,149  3/1977  Nozik .................................. 204/129
4,042,758  8/1977  Weinstein ........................... 204/129

OTHER PUBLICATIONS

P. Würfel & W. Ruppel, "Upper Limit of TPV Solar-Energy Conversion", Apr. 1980, IEEE Transactions on Ele. Devices, pp. 745-750.
K. Rajeshwar et al., "E. Conversion in PCE Systems-A Review", 1978, Electrochimica Acta, vol. 23, pp. 1117-1141.
R. Bell, "Conc. Ratio and Eff. in TPV's, Solar Energy, vol. 23, pp. 203-210, 1979.

Primary Examiner—Samuel Scott
Assistant Examiner—G. Anderson
Attorney, Agent, or Firm—Jack C. Munro

[57] ABSTRACT

A spectral converter which is to be used to produce chemical reactions. Full spectrum solar radiation is received, concentrated and directed into a blackbody collector. The collector converts the energy of solar radiation into heat. The collector then conducts the heat to a vapor phase material, such as selenium or mercury, which then re-emits the energy as line spectra or broad band spectra. This radiated emission is caused to be directed in a particular direction from the collector through a window, which may be constructed of quartz. The radiation then passes through a filter, such as a dichroic filter which permits passage of only the desired range of radiation frequencies and causes all other radiation frequencies to be reflected back into the collector. The desired range of radiation frequencies is then conducted into an optical device which collimates the desired range of radiation frequencies. This resulting collimated beam is conducted into a chemical dissociation cell which thereupon causes a particularly desired chemical reaction to occur.

14 Claims, 3 Drawing Figures

SPECTRAL CONVERTOR

BACKGROUND OF THE INVENTION

It has been known for some time that chemical compounds, such as water, are capable of dissociation when irradiated with a certain frequency radiation (ultraviolet for water). However, previous to this invention, to employ solar radiation with any degree of efficiency to accomplish dissociation of compounds has not been feasible. Prior art technology has been in the range of about one percent efficiency.

Previous to this invention, there has not been known any device which utilized solar radiation to dissociate the chemical compounds with any reasonable degree of efficiency.

SUMMARY OF THE INVENTION

The structure of this invention employes the use of a solar radiation concentrator which is in the form of a reflector disc or transmission concentrator which is to receive spectrum solar radiation and direct such to a given area. Within this given area is located a blackbody or heat collector which takes the form of a hollow cylinder. Within the hollow cylinder is to be located a substance, such as a compound of selenium and/or mercury which, when excited by the heat from the solar radiation, randomly emits radiation within a certain frequency range such as ultraviolet. By selecting of the substance within the blackbody collector, the frequency of the radiation produced can be varied. The emitted radiation from the substance is conducted through a window, such as a high silicon glass or quartz window, mounted within the wall of the blackbody collector. The radiation emitted within the blackbody collector is reflected from the interior wall of such until it is directed through the window. The radiation, after passing through the window, contacts a filter, such as a selective pass, dichroic filter, which permits passage of the desired radiation frequency but which reflects undesired frequencies back through the window to within the blackbody collector which causes these frequencies to be reutilized in the heating of the substance within the blackbody collector. An optical management system in the form of lenses, mirrors, and light conducting pipes receives and collimates the desired range of frequency radiation and directs such into a chemical dissociation cell. Within the chemical dissociation cell is to be located a quantity of the chemical which is to be associated. Examples of dissociated chemicals could be water, methane gas and ammonia. Also, the ammonia could be produced from nitrogen and water and the methane produced from carbon dioxide and water. In other words, the structure of this invention can also be used to form chemical association. The products from the chemical cell are to be discharged to desired locations.

The primary objective of this invention is to construct a spectral convertor which photochemically causes chemical reactions at least at a minimal level of efficiency.

Another objective of this invention is to utilize the least useful frequencies of the full solar spectrum to produce certain desired frequency range which is then utilized.

Stating the primary objective of the present invention another way, solar frequencies (1,800 to 18,000 angstroms) which are not very useful in themselves for directly producing photochemical reactions are utilized to produce energy which is most useful in the causing of photochemical reactions (1,050 to 4,000 angstroms).

DETAILED DESCRIPTION OF THE SHOWN EMBODIMENT

Roughly half of the sun's emitted energy is in the form of visable and ultraviolet light, although less than five percent of the energy actually striking the earth's surface is in the ultraviolet region of the spectrum. The remaining half of the sun's energy consists of near infrared and infrared light. This is the region of the spectrum not normally regarded as useful for promoting the electronic excitation needed to break chemical bonds because covalent bond energies exceed the energy available from such light. Thus, if useful energy is to be obtained efficiently from solar energy, an energy transduction system sensitive to visible light must be used. The structure of this invention achieves the foregoing objectives.

Figure 1:
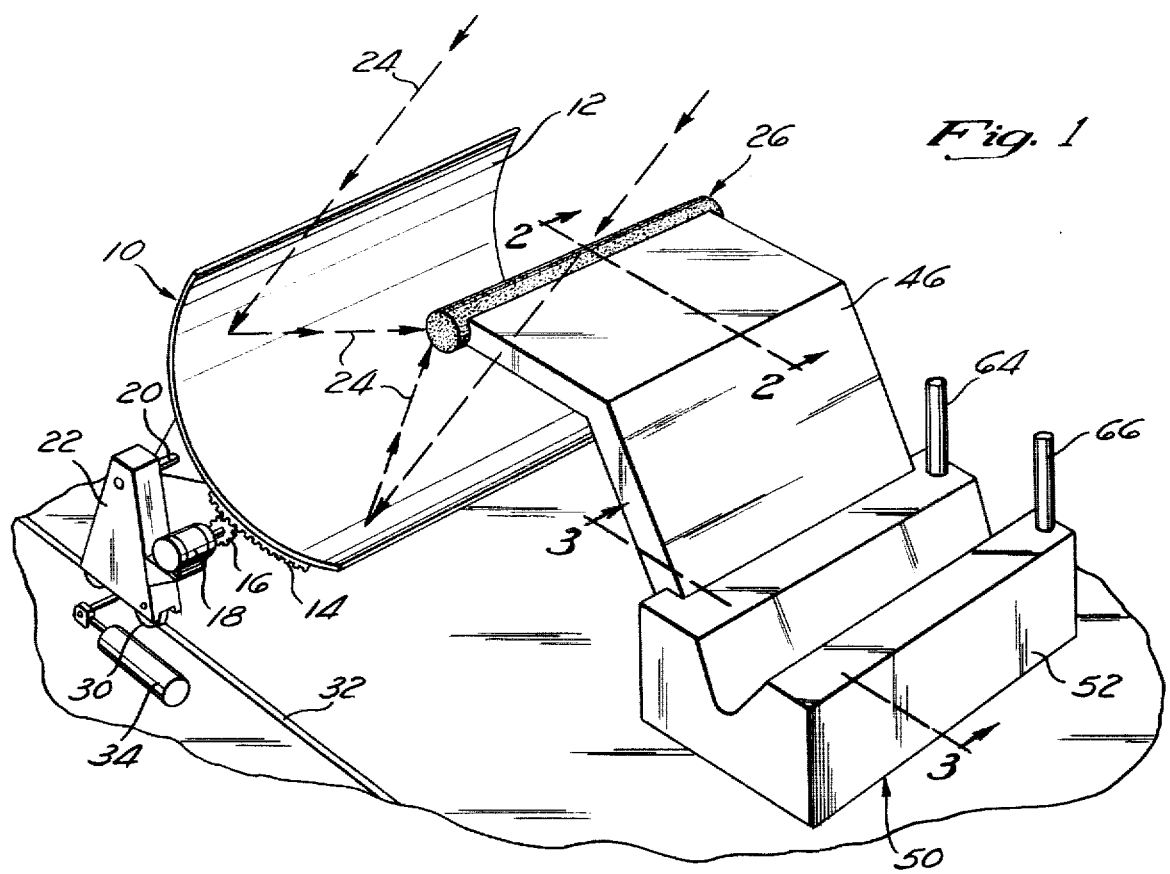
FIG. 1 is an isometric view of a proposed spectral convertor which is to be employed in accordance with this invention.
Figure 2:
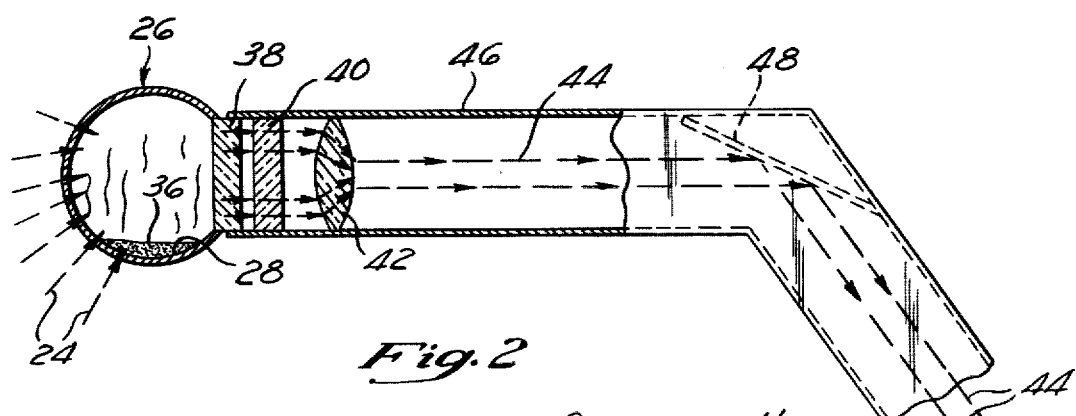
FIG. 2 is a cross-sectional view through a portion of the spectral convertor of this invention taken along line 2—2 of FIG. 1.
Figure 3:
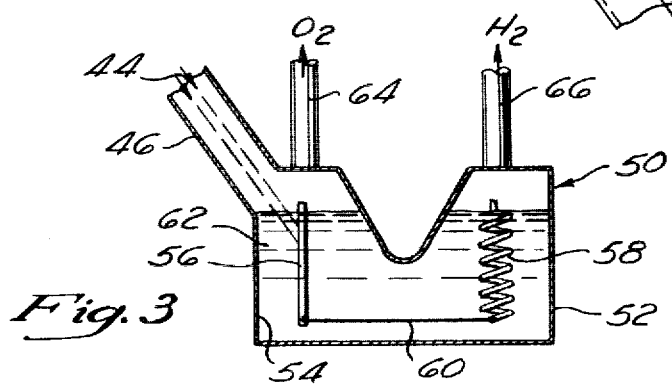
FIG. 3 is a cross-sectional view through the photochemical cell employed in conjunction with this invention taken along line 3—3 of FIG. 1.

Referring particularly to the drawing, there is shown in FIG. 1 a reflective dish 10 which has an inner reflecting surface 12. The dish 10 is to be constructed of a rigid material and the inner surface 12 will be a highly polished metallic mirrored surface.

Secured to the back side of the dish 10 is a gear rack 14. This gear rack 14 is to connect with a drive gear 16 which is to be rotatably driven by means of a motor 18. The motor 18 is to be operated from a source of electrical energy (not shown) to cause pivoting of the dish 10 about axle 20. The axle 20 extends from a housing 22. The motor 18 is also fixedly mounted on a portion of the housing 22. The function of the pivoting of the dish 10 is to position the reflecting surface 12 to directly receive the solar rays. The depiction of the solar rays is shown by means of arrows 24.

The solar rays when reflected from the reflecting surface 12 concentrates the rays within a given area. Within this given area is located a collector 26. This collector 26 is basically in the shape of a thin walled cylinder which has a black exterior surface so that the collector 26 functions as a blackbody.

The solar energy entering the inner chamber 28 of the blackbody collector 26 causes the interior of the chamber 28 to substantially raise in temperature. This raise in temperature can be varied depending upon the position of the reflective dish 10. In other words, the closer the blackbody collector 26 to the focal point of the reflective surface 12, the higher the temperature within the chamber 28. The farther away the collector 26 is from the focal point, the lower the temperature. In order to vary the position of the reflector 10, the housing 22 is mounted on wheels 30 which in turn rides upon a guide track 32. The housing 22 is connected through a hydraulic actuator 34. Thereby, upon operating of the hydraulic actuator 34, the housing 22 is moved along the track 32. This in turn varies the position of the reflector 10.

Located within the chamber 28 is a small quantity of a chemical substance. This substance is to exhibit certain properties upon being heated by the full spectrum solar energy which is penetrating to within the chamber 28. Basically, these properties are that the molecules of the chemical substance 36 are excited so as to pump electrons out of their orbits to higher than ground state energy levels. These electrons have the natural tendency to return to ground state. When these electrons do randomly return to ground state, frequencies of radiation are produced depending upon the type of substance 36. For example, neon gas might be pumped with 2,601 angstrom radiation obtained from nickel. This radiation would be at a very high concentration, which would then cause the neon gas to emit 3,520 angstrom high energy ultraviolet. This ultraviolet would be highly concentrated and the advantage of the present invention is that the full spectrum frequency ranges have been employed to cause a concentrated emission of a certain portion of the full spectrum radiation. This concentrated emission can be employed with a reasonable degree of efficiency to achieve its desired end result, which will be explained further on in the specification.

Desirable types of substances 36 would be substances which contain selenium or mercury. However, examples of other substances which may prove to be desirable in certain instances would be arsenic, krypton, tungsten and rubidium.

Now that the substance 36 has produced radiation within the desired frequency range, it is necessary to extract only that type of radiation and concentrate it into a single beam. In order to achieve this, the backside of the blackbody collector 26 includes a window 38. This window 38 will be constructed to readily pass the radiation within the desired frequency range. Certain types of glasses, for example, are not receptive to transmitting of ultraviolet radiation. Therefore, a certain type of construction for the window 38 must be used such as a quartz material or a high silicon glass.

After the radiation passes through the window 38, the radiation immediately comes into contact with a high-pass, dichroic filter 40. The filter 40 is to permit passage therethrough of only the radiation within the desired frequency. Undesirable radiation frequencies are reflected from the dichroic filter 40 back through the window 38 and into the chamber 28. These reflected radiation frequencies are again utilized to increase the temperature within the chamber 28. It is to be understood that the desirable radiation frequencies will be reflected off the inner surface of the chamber 28 until these frequencies pass through the window 38.

After the radiation frequencies have been conducted through the filter 40, they are caused to pass through an optical management assembly which is shown generally here as a lens 42. The lens 42 functions to collimate the radiation into a beam 44. This beam 44 passes through a light pipe 46 which also functions to support the filter 40 and the lens 42 and connects with the exterior of the window 38. Within the light pipe 46 there may be employed a reflector 48 to redirect the beam 44 into another desired direction.

The directed beam 44 is then to be directed to its point of utilization. An example of the preferred form of utilization would be in a chemical dissociation cell 50. This cell 50 is basically a housing 52 which includes an internal chamber 54. The light pipe 46 extends through the wall of the housing 52 and the collimated beam 44 radiation is to be conducted within the chamber 54.

Within the chamber 54 is to be located a plate 56 and a coil 58. The plate 56 is to be of a particular material construction such as strontium titanate. The coil 58 is also to be of a particular material construction such as a platinum. The plate 56 and coil 58 are innerconnected together by an electrical conducting wire 60. Therefore, the plate 56 and the coil 58 function as electrodes, as in a battery.

Within the chamber 54 is to be located a chemical compound 62, one example of which being water. If water was the compound 62, upon the collimated beam 44 striking the plate 56, the production of oxygen which is permitted to rise and be conducted outward through outlet pipe 64. Simultaneously, hydrogen is produced at the coil 58. This hydrogen also rises and is conducted out through outlet pipe 56. The released oxygen and hydrogen will then be conducted to appropriate storage facilities to be then utilized in a desired manner.

It is to be understood that the exact construction of the chemical dissociation cell 50 may be somewhat modified as the cell 50 shown here is only for diagramatic purposes.

Using the process and structure of this invention, the invention can be employed to collect high concentration of almost any frequency of solar energy (or from any other source) and reradiate that frequency in a relatively high efficiency.

What is claimed is:

1. A spectral convertor comprising:
   a solar radiation concentrator able to receive and to direct full spectrum solar radiation and concentrate said solar radiation in a given area;
   a heat collector mounted within a given area, said heat collector comprising an internal chamber enclosed by a thin wall, said thin wall permitting conduction of the energy of said full spectrum solar radiation into said internal chamber as heat;
   a substance located within said chamber, said substance being reactive to said full spectrum solar radiation which results in the radiating from said substance a desired range of optical radiation frequencies;
   a window mounted within said thin wall, said window permitting passage of said desired range of optical radiation frequencies;
   filter means located adjacent said window, said filter means permitting passage of said desired range of optical radiation frequencies and being reflective of all other radiation frequencies;
   an optical management system for collecting and collimating said desired range of optical radiation frequencies; and
   a chemical dissociation cell, conducting said collimated beam into said cell, using said collimated beam within said cell to produce a chemical change within a compound contained within said cell.

2. The spectral convertor as defined in claim 1 wherein:
   said heat collector to emit radiation only in a particular desired direction.

3. The spectral convertor as defined in claim 1 wherein:
   said thin wall including means to facilitate absorption of said solar radiation.

4. The spectral convertor as defined in claim 1 wherein:
said filter means directs said reflected radiation frequencies back into said collector.

5. The spectral convertor as defined in claim 1 wherein:
said chemical dissociation cell being irradiated with selected spectra emitted from said internal chamber to provide excitation energy for electrochemical and photoelectrochemical reactions.

6. The spectral convertor as defined in claim 1 wherein:
said chemical dissociation cell is irradiated with selected spectra emitted from said internal chamber to provide the excitation energy for endoenergetic photochemical reactions.

7. The spectral convertor as defined in claim 1 wherein:
said chemical dissociation cell being irradiated with selected spectra emitted from said internal chamber, the frequency of said selected spectra being predetermined.

8. A spectral convertor comprising:
a solar radiation concentrator able to receive and to direct full spectrum solar radiation and concentrate said solar radiation in a given area;
a heat collector mounted within said given area, said heat collector comprising an internal chamber enclosed by a thin wall, said thin wall permitting conduction of the energy of said full spectrum solar radiation into said internal chamber as heat;
a substance located within said chamber, said substance being reactive to said full spectrum solar radiation which results in the radiating from said substance a desired range of optical radiation frequencies;
a window mounted within said thin wall, said window permitting passage of said desired range of optical radiation frequencies;
filter means located adjacent said window, said filter means permitting passage of said desired range of optical radiation frequencies and being reflective of all other radiation frequencies;
an optical management system for collecting and collimating said desired range of optical radiation frequencies into a collimated beam;
a chemical dissociation cell, conducting said collimated beam into said cell, using said collimated beam within said cell to produce a chemical change within a compound contained within said cell;
said compound located within said chemical dissociation cell comprises water, said chemical change being breaking down of said water into hydrogen and oxygen, providing discharge means in association with said cell for removing separately said hydrogen and oxygen from said cell; and
said window being formed of quartz and said substance includes selenium.

9. A spectral convertor comprising:
a solar radiation concentrator able to receive and to direct full spectrum solar radiation and concentrate said solar radiation in a given area;
a heat collector mounted within said given area, said heat collector comprising an internal chamber enclosed by a thin wall, said thin wall permitting conduction of the energy of said full spectrum solar radiation into said internal chamber as heat;
a substance located within said chamber, said substance being reactive to said full spectrum solar radiation which results in the radiating from said substance a desired range of optical radiation frequencies, said substance being in the group consisting of selenium, mercury, arsenic, krypton, tungsten and rubidium; and
a window mounted within said thin wall, said window permitting passage of said desired range of optical radiation frequencies; and
a chemical dissociation cell, conducting of said desired range of optical radiation frequencies into said cell using said desired range of optical radiation frequencies within said cell to produce a chemical change within a compound contained within said cell.

10. The spectral convertor as defined in claim 9 including;
filter means located adjacent said window, said filter means permitting passage of said desired range of optical radiation frequencies and being reflective of all other radiation frequencies.

11. The spectral convertor as defined in claim 10 wherein:
an optical management system for collecting and collimating said desired range of optical radiation frequencies into a collimated beam.

12. The spectral convertor as defined in claim 11 wherein:
said filter means directs said reflected radiation frequencies back into said collector.

13. The spectral convertor as defined in claim 12 wherein:
said heat collector to emit radiation only in a particular desired direction.

14. A spectral convertor comprising:
a solar radiation concentrator able to receive and to direct full spectrum solar radiation and concentrate said solar radiation in a given area;
a heat collector mounted within said given area, said heat collector comprising an internal chamber enclosed by a thin wall, said thin wall permitting conduction of the energy of said full spectrum solar radiation into said internal chamber as heat;
a substance located within said chamber, said substance being reactive to said full spectrum solar radiation which results in the radiating from said substance a desired range of optical radiation frequencies;
a window mounted within said thin wall, said window permitting passage of said desired range of optical radiation frequencies;
filter means located adjacent said window, permitting passage of said desired range of optical radiation frequencies and being reflective of all other radiation frequencies;
an optical management system for collecting and collimating said desired range of optical radiation frequencies into a collimated beam;
a chemical dissociation cell, conducting said collimated beam into said cell, using said collimated beam within said cell to produce a chemical change within a compound contained within said cell;
said compound located within said chemical dissociation comprises water, said chemical change being breaking down of said water into hydrogen and oxygen, providing discharge means in association with said cell for removing separately said hydrogen and oxygen from said cell; and
said substance being from the group consisting of selenium, mercury, arsenic, krypton, tungsten and rubidium.

* * * * *